Oct. 17, 1950    E. MERCIER    2,526,384
MACHINE HAVING FREE PISTONS AND CYLINDERS WITHOUT
MECHANICAL CONNECTING-ROD-CRANK COUPLINGS
Filed Aug. 1, 1947    8 Sheets-Sheet 1

Fig.1

Ernest Mercier
INVENTOR

By George H. Corey

His Attorney

Fig.3

Oct. 17, 1950 E. MERCIER 2,526,384
MACHINE HAVING FREE PISTONS AND CYLINDERS WITHOUT
MECHANICAL CONNECTING-ROD-CRANK COUPLINGS
Filed Aug. 1, 1947 8 Sheets-Sheet 5

Ernest Mercier
INVENTOR
By George H. Corey
His Attorney

Oct. 17, 1950  E. MERCIER  2,526,384
MACHINE HAVING FREE PISTONS AND CYLINDERS WITHOUT
MECHANICAL CONNECTING-ROD-CRANK COUPLINGS
Filed Aug. 1, 1947  8 Sheets-Sheet 6

Ernest Mercier
INVENTOR
By George H. Corey
His Attorney

Oct. 17, 1950  E. MERCIER  2,526,384
MACHINE HAVING FREE PISTONS AND CYLINDERS WITHOUT
MECHANICAL CONNECTING-ROD-CRANK COUPLINGS
Filed Aug. 1, 1947  8 Sheets-Sheet 7

Ernest Mercier
INVENTOR
By George H. Corey
His Attorney

Patented Oct. 17, 1950

2,526,384

UNITED STATES PATENT OFFICE 2,526,384

MACHINE HAVING FREE PISTONS AND CYLINDERS WITHOUT MECHANICAL CONNECTING-ROD-CRANK COUPLINGS

Ernest Mercier, Paris, France, assignor, by mesne assignments, to Moore, Inc., Atlanta, Ga., a corporation of Georgia Application August 1, 1947, Serial No. 765,454
In France February 1, 1939

Section 1, Public Law 690, August 8, 1946
Patent expires February 1, 1959

45 Claims. (Cl. 123—46)

The present invention relates to machines with free pistons of the motor-compressor type or of the auto-generator type. An auto-generator is a machine in which compressed air is supplied to a motor and is finally used in the form of exhaust gases under pressure. The machines to which the invention relates comprise on the one hand at least two motor cylinders each of which supplies a driving impulse at each stroke of its pistons, and on the other hand at least one double-acting air-compressing cylinder or two single-acting air-compressing cylinders, effecting a compression at each stroke of the pistons thereof.

These machines present the advantage of being more flexible than the machines that have only one driving impulse for two strokes of the pistons. Moreover, they enable the motive power of one of the motor cylinders to be used for returning the pistons of the other motor cylinders towards their inner dead centre and for compressing the gases of the said other motor cylinder with a view to the development of power therefrom in the succeeding power stroke. They therefore obviate the use of the cushion accumulators of compressed air generally utilised for this purpose, which unnecessarily increase the weight of the machine.

The machine according to the invention has all its movable elements, particularly the pistons of the motor cylinders and of the compressor cylinders, united into two distinct units, each unit constituting a whole that moves as a single rigidly arranged piece, the movements of which are synchronised with those of the other composite unit by balance levers, as known in itself, but it is distinguished from earlier machines of this type by the fact that all the pistons and all the heads, if any, of the motor cylinders and of the compressor cylinder or cylinders are freely movable and belong to one or to the other of the two distinct movable units.

The arms of the balance levers that synchronise the movements of the two movable units are of lengths inversely proportional to the masses of each of the movable units articulated to their respective ends.

Thanks to this arrangement the cylinders, which do not comprise any fixed cover, are therefore subjected to radial forces only, which they can easily support. The machine may therefore have a very light frame, contrary to what has been experienced hitherto with all machines of this type.

One of the movable units may conveniently comprise outer motor piston and the compressor pistons or pistons while the other movable unit comprises inner motor pistons and the compressor cylinder.

A further object of the invention is to arrange two units composed of movable elements of the machine in such a way that each element (motor pistons, compressor piston, compressor bottom or head) of one of the units has in the other unit a corresponding element of geometrically identical surface that is subjected to the action of an equal weight of gas or of compressed air.

In this way the movable elements will not have to transmit any appreciable force under any circumstances, through the medium of the suspension and connection mechanisms that ensure the correct relative positions of the two composite units of movable elements, either from one of these units to the other, or from these units to the stationary frame; and this will be the case not merely during normal operation but also during disturbed working, for instance, in the case of violent explosions of the fuel, or of the ignition misfiring, or in any other analogous case.

The invention therefore enables machines to be constructed with free pistons the oscillations of which are entirely liberated from all unnecessary constraints, and which will enable a greater power per unit of mass to be obtained, an improved efficiency, increased durability and smoother working.

Other advantages will be gathered from the following description of various embodiments of the invention given by way of example.

The accompanying drawings illustrate by way of example several embodiments of a machine according to the invention.

The apparatus illustrated in Figures 1 to 14 is based on the principle above set forth; the movable masses comprise a compressor piston 1, two opposite engine pistons 2, a rod 3, of tubular form in this embodiment, connecting these three members, the cylinder 4 of the air compressor, and two engine pistons 5 symmetrically arranged two by two with the engine pistons 2.

Figure 1:
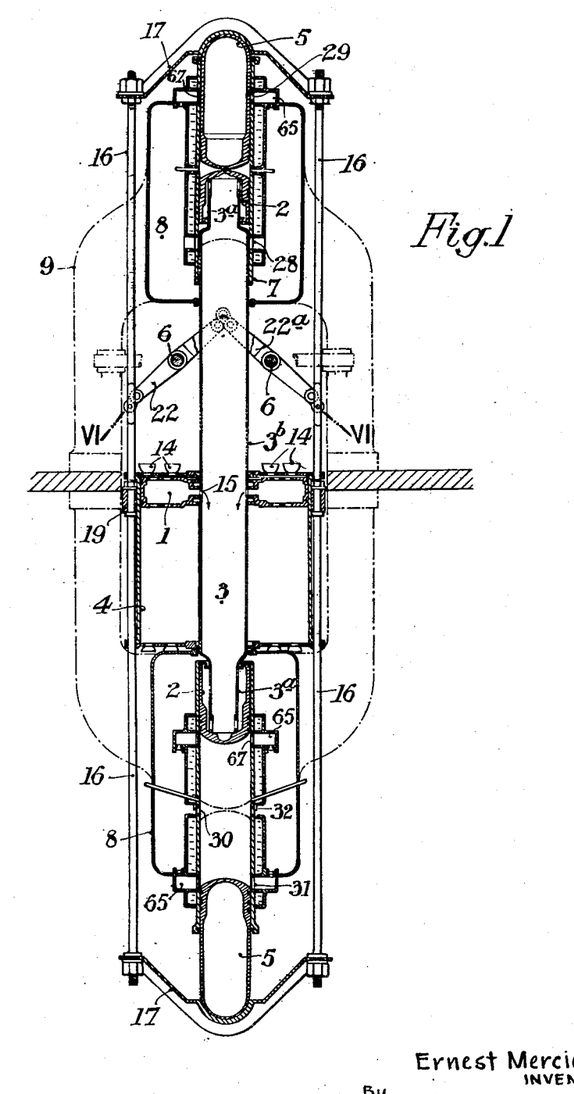
Figure 1 is a diagrammatic vertical section of a first embodiment.

Geometrically speaking, one of the ends of the cylinder 4 corresponds to one of the faces of the piston 1 and the other end of the said cylinder corresponds to the other face of the said piston. Equal masses of compressed air act upon these geometrically similar elements.

The stationary elements comprise shafts 6, from which the oscillating masses are suspended, engine cylinders 7, the casings 8 of the intermediate receivers, the regulating devices, and the frame 9.

Such a machine presents the maximum advantages if both systems of movable masses are balanced therein which presents no difficulty; since the heavy elements and the regulating elements are stationary, which is logical and convenient.

The machine thus comprises a central air compressor driven by two engines having free pistons placed on either side of said compressor.

Figure 6:
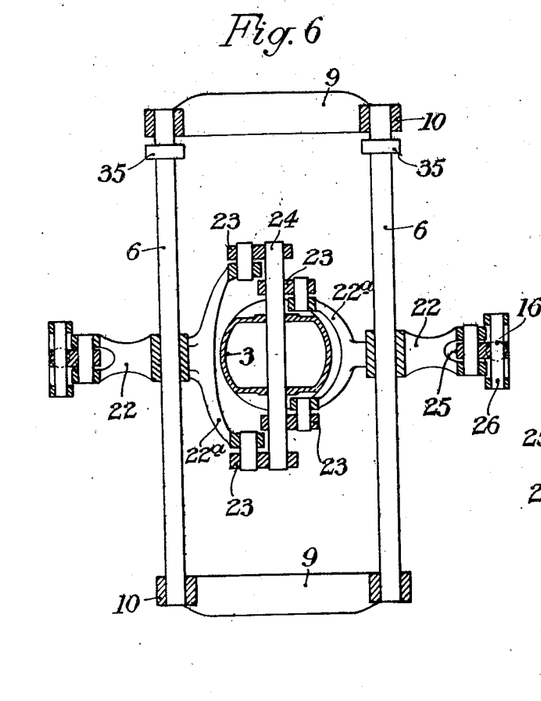
Figure 6 is a cross section made according to line VI—VI of Figure 1.

In Fig. 1, the frame 9 has been shown in dot and dash lines because it is, in reality, placed at 90° relatively to the plane of said figure; it supports, in particular, the two symmetrical suspension shafts 6 by means of bearings 10, Fig. 6.

The hollow rod 3 connecting the pistons 2 is constituted by two cylindrical portions 3a, of reduced diameters, and by a central tube 3b of larger diameter, connected by annular curved surfaces 3c, which impart a certain resiliency to the structure; the ends of the rod press against the pistons through spherical bearings ensuring a certain freedom of play.

Suitably arranged claws serve as support for springs 11 which ensure the permanent contact of the rod and pistons without preventing the desirable freedom of play.

Figure 14:
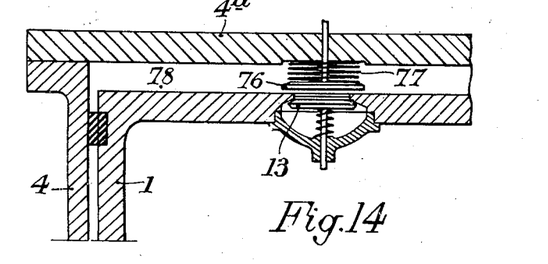
Figure 14 is a partial vertical section of the compressor of Figure 1, showing a safety device.

The suction valves 12 of the compressor are placed on the flat heads of the cylinder 4 and the delivery valves 13 are mounted on the inside faces of the hollow piston 1 as shown in Fig. 14. Inertia facilitates the correct operation of all these valves. The movement of the casing 4 improves the volumetric efficiency at the suction and the flared sleeves 14 improve the action thereof.

The compressed air passes through orifices 15 from the interior of the compressor pistons to the interior of the hollow rod 3. It then follows the path indicated by the arrows to alternately reach the lower intermediate receiver 8 or the upper intermediate receiver 8. As it passes, the air efficiently cools the walls of the pistons 2 which, for that purpose, are internally provided with suitable fins.

Fig. 1 has been drawn assuming that the two pistons 2 and 5 of the upper cylinder are about to come into contact. It will be seen hereinafter how the various clearance spaces are determined.

The two engine pistons 5 opposite to the pistons 2 and moving in reverse direction to the latter are connected together by a system of tie-rods 16, arms 17 and spherical collars 18, and are also connected to the compressor cylinder 4 by lugs 19, flanges 20 and nuts 21.

The apparatus operates in the known manner under the action of the driving impulses produced at each stroke by the combustion of a mixture of air and of combustible liquid injected into the engine cylinders between the pistons.

The invention comprises the connection between the two movable units by means of two symmetrical levers or balance beams 22, 22a pivoting about shafts 6. In the case illustrated in which the masses of the two units are assumed to be equal, both arms 22, 22a of each balance beam are equal.

Figure 7:
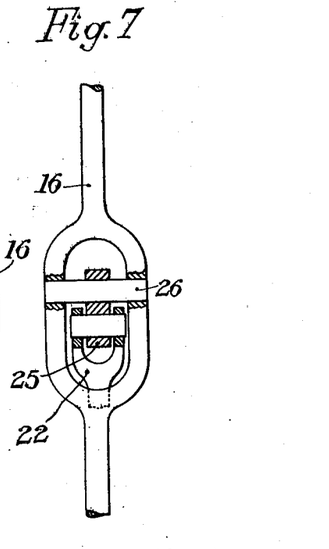
Figure 7 is a partial side elevation corresponding to Figure 6.

They are connected to the central connecting member by links 23 and a spindle 24, and connected to the cylinder 4 of the compressor by links 25 and spindles 26 carried by the rods 16 (Fig. 7).

In Fig. 6 it will be seen that the two symmetrical shafts 6 each carry a lever 22 coming in contact with the spindle 24 by means of a fork 22a and two links 23.

This arrangement is very simple, in particular all the accelerations oblique relative to the axis of the apparatus compensate each other.

The construction of the apparatus satisfies all the conditions set forth in the preamble.

At every stroke, the movable bodies receive at every instant amounts of movement which are equal and opposite—their speeds, in the present case are equal and opposite—they are subjected to exactly identical reactions owing to the compressions in the engine cylinders and compressor cylinder.

No disturbing element is to be feared as the forces of friction, either in the engine cylinders, or in the compression cylinder, are exactly the same for both movable units.

The only friction forces which are not compensated are those of the stuffing-boxes 27 or other fluid-tight members at the place where the rod passes into the intermediate receivers 8, but their action is insignificant, and they are the only ones which are capable of exerting an additional stress on the supports of the shafts 6 or a banding stress exerted on the levers 22. These shafts 6 transmit no appreciable periodical vertical stress to the frame 9 and the arms 22, 22a of the levers are subjected to no external bending stress. These members have only to withstand the static stress exerted by the weights of the oscillating masses and the stresses due to their own accelerations of the levers themselves and of their links.

An apparatus devised according to these principles is particularly economical in construction and of high efficiency:

Economical, because it comprises only light and simple mechanical members, as it comprises neither recovering devices, nor springs, nor gaseous supporting cushions.

Economical also, because it supplies power double that of an ordinary apparatus having free pistons provided with an engine having the same dimensions. It comprises, by comparison with such an apparatus, as supplementary elements, only a second identical engine, four tie-rods 16 and an increase of the length of the compressor cylinder 4. It saves, on the contrary, twice the entire structure comprising the connecting-rods, the recovering devices and their accessories.

It is of high efficiency, because it has no mechanical equipment (connecting-rods and crank) developing appreciable stresses, because it has no supplementary apparatus such as a recovering device, and because, its air compressor being of twice the length, the influence of the clearances therein is reduced proportionally.

It has an available power higher than two equivalent simple machines owing to the higher volumetric output of its compressor.

In any stroke whatever, although the useful stroke of the compressor is double that of a simple machine, the cylinder 4 on the one hand, the piston 1 on the other hand, each effect half the stroke and the speeds of each of these elements are not higher than that of the movable elements of a simple machine.

The central distribution of air by the hollow rod 3 has considerable advantages:

1. It allows an efficient cooling of the inner pistons 2 without loss, the cooling of the outer pistons 5 presenting no difficulty.

2. Owing to the change of diameter at the curved surfaces 3c, the central rod 3, at its flared part, penetrates within each engine cylinder 7, nearly completely preventing the passage of air when the air is to be sent into the other engine cylinder.

Figure 2:
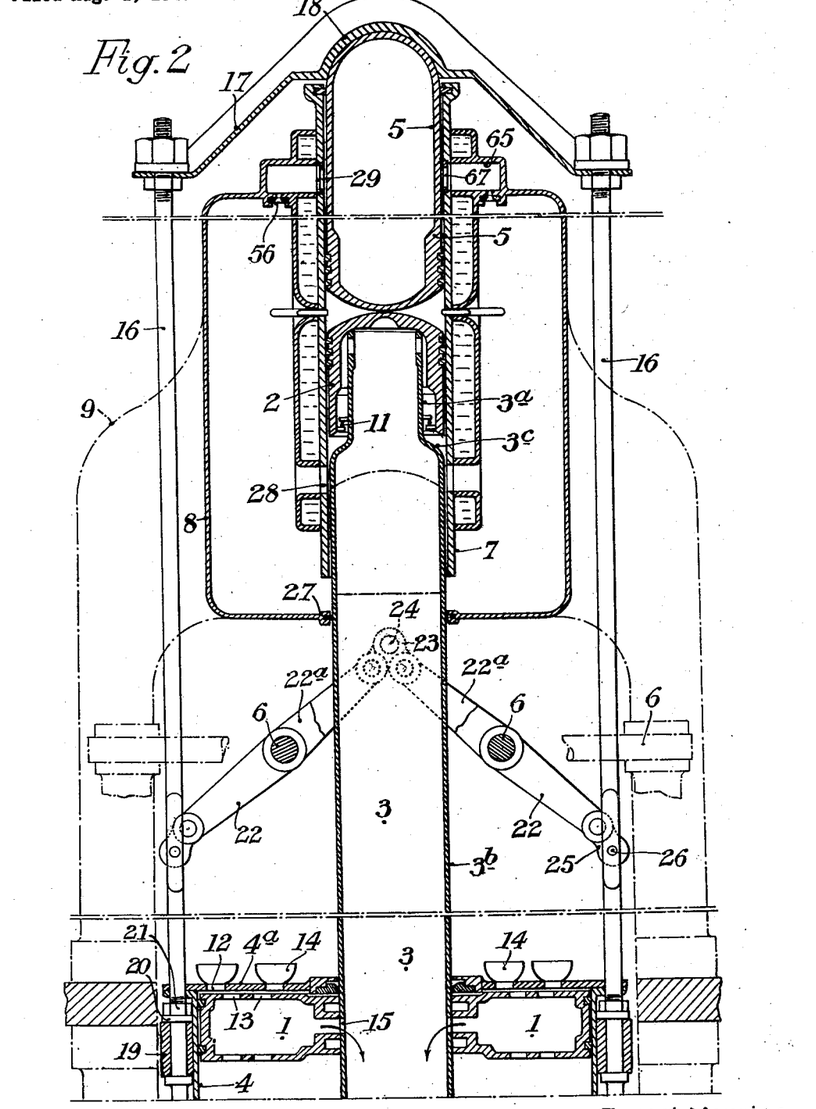
Figures 2 and 3 show, on an enlarged scale, the top and bottom parts of the same machine.
Figure 3:
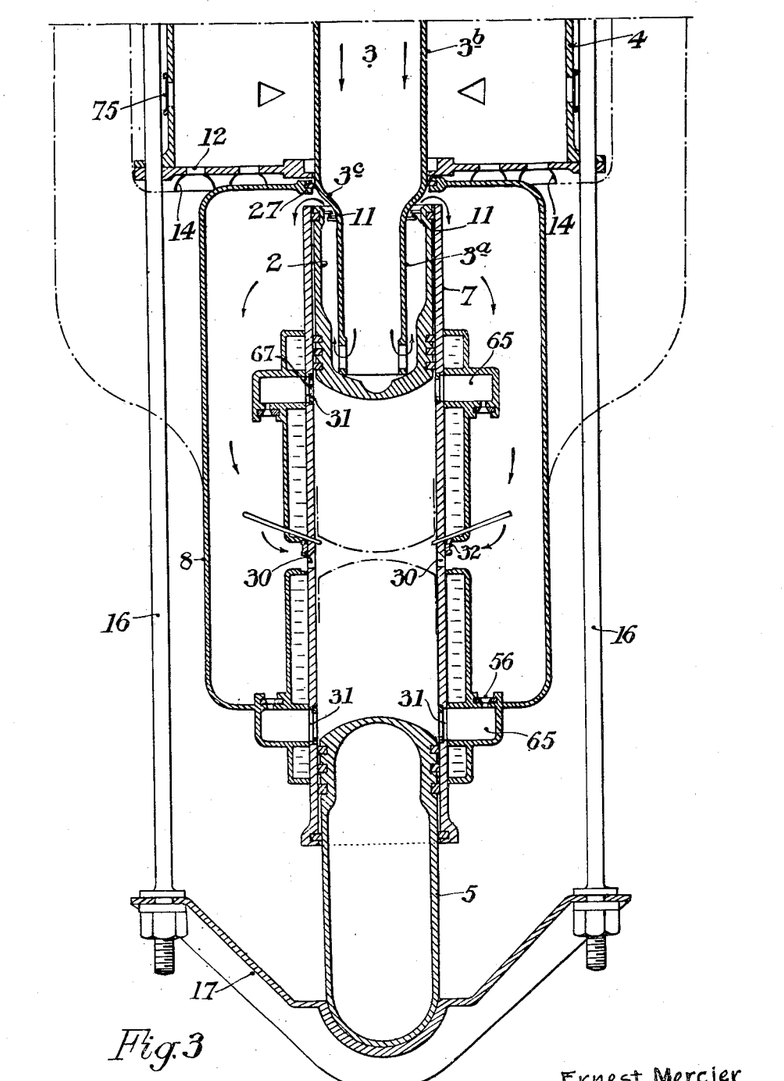

For the admission and the exhaust of the engine cylinders, the arrangement may be adopted in which, as indicated in Fig. 2, the air is admitted into the cylinder 7 through the orifices 28 at the end nearer the compressor and the gases escape through the orifices 29 at the outer end.

Figure 4:
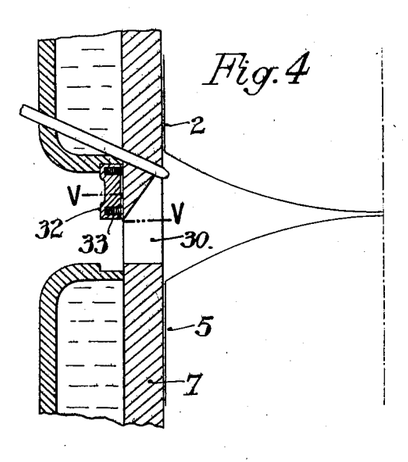
Figure 4 is a partial vertical section on a still larger scale, showing the details of an annular closure member.

In Fig. 1, at the top, and in Fig. 2 this embodiment has been shown. Also in Fig. 1, at the bottom, in Fig. 3, a different embodiment has been illustrated which is particularly advantageous as it is perfectly symmetrical and capable of ensuring at every instant the perfect equality of the movements imparted to the two movable bodies. In this latter arrangement, the air enters midway between the ends of the cylinder 7, through orifices 30, which have a small height because they cover the entire circumference of the cylinder. The gases escape through symmetrical openings 31 at both ends of the cylinder. In these conditions, the length of the path to be followed by the air in the cylinders is equal to only half the stroke and its movements is facilitated by the rounded shape of the pistons. The closure of the air inlet orifices 30 is ensured by a solid ring 32 moving outside the cylinder parallel to its axis and controlled by a transmission (not shown) actuated by the shafts 6, the latter being keyed with the levers 22 and rotating in their bearings 10 (Fig. 6). The fluid-tightness of the ring 32 is ensured by two fluid-tight rings or segments 33 (Fig. 4).

Figure 5:
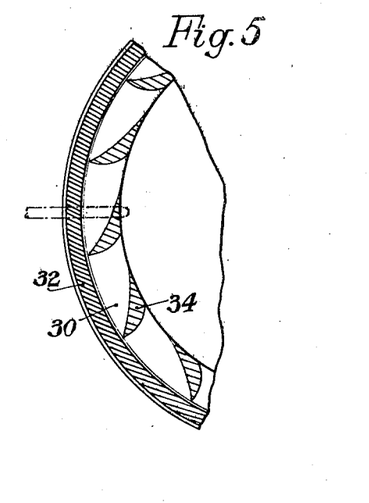
Figure 5 is a partial horizontal section made according to line V—V of Figure 4.

Fig. 5 illustrates a sectional view at right angles to the axis—at the level of the inlet ports 30. The partitions 34 separating said ports are shaped in such a manner as to protect the seal ring 32 against the direct radiation of the flame from within the cylinder 7.

This type of machine easily lends itself to the construction of a particularly simple and efficient regulation system.

The regulating devices are driven at 35 (Fig. 6) directly by the shafts 6.

Each shaft 6 carries at its end (Figs. 9 to 12) a collar keyed thereon, driving, by means of an arm 37 and a link 38, a piston 39 sliding within a pump body 40. Within the pump body a sleeve valve 41 operated by an arm 42 is rotatable upon its axis. The pump body is provided with two longitudinal grooves of unequal lengths 43 and 44 which can be gradually closed by the valve 41, the latter being provided with suitable helical grooves 45 and 46. The device is completed by valves 47, 48, 49, 50, 51 and 52.

Figures 9, 12, 13:
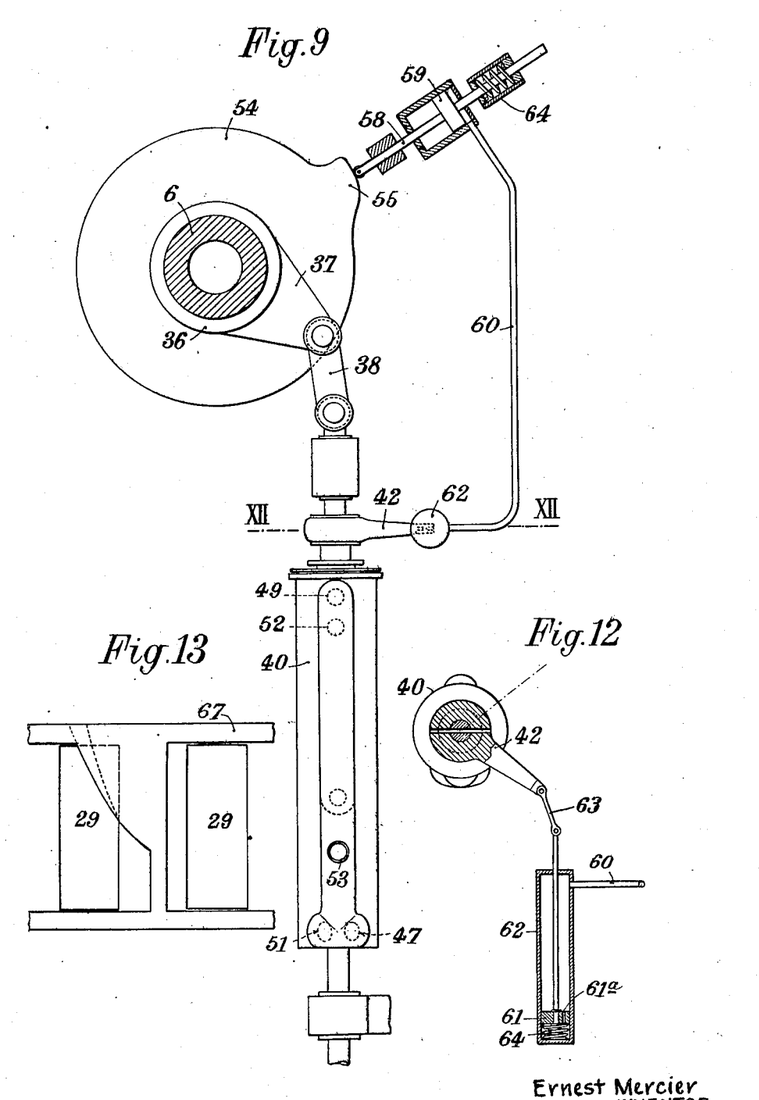
Figure 9 is an elevation with partial vertical section of a device for regulating the machine.
Figure 12 is a partial horizontal section made on line XII—XII of Figure 9.
Figure 13 shows a detail of a distributing ring.
Figure 10:
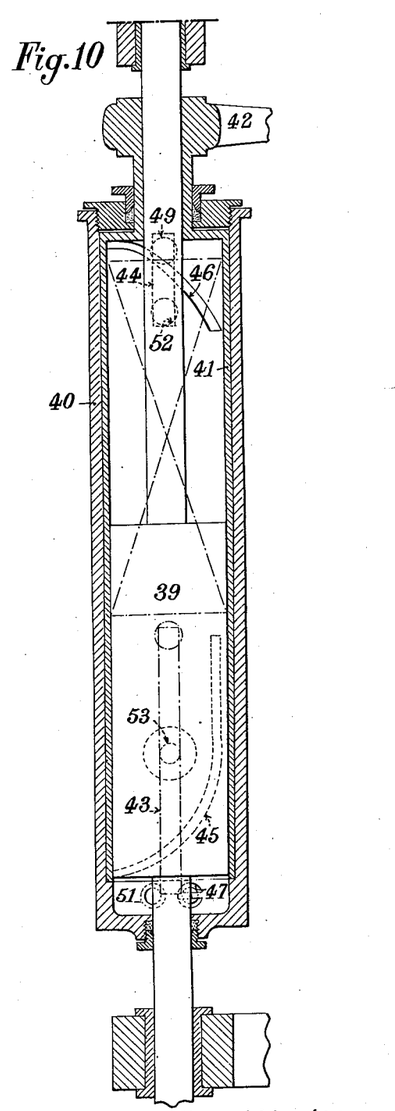
Figures 10 and 11 are vertical sections made on the vertical axis of member 40, Figure 9.
Figure 11:
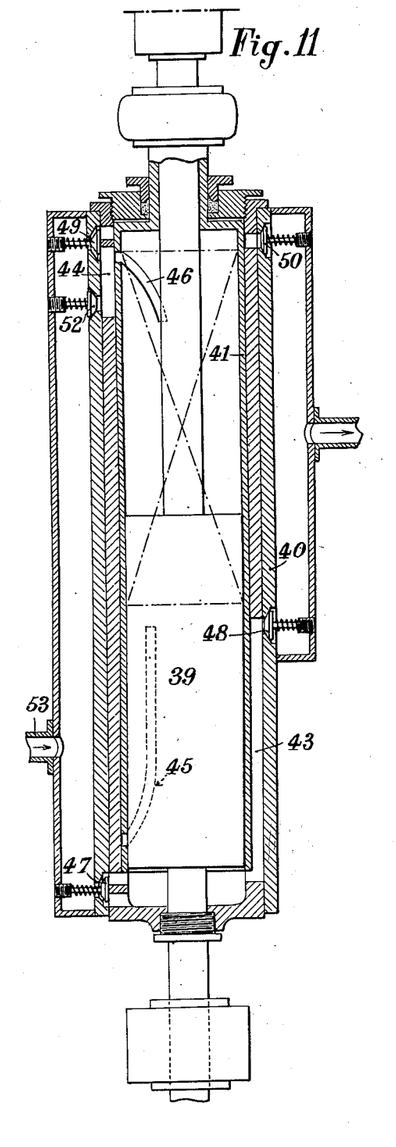

During the downward stroke, the piston 39 (the length of which is determined for ensuring correct distribution) delivers the liquid fuel through the channel 43 and the valve 48 towards the control for the needles injecting the fuel into the driving cylinders; the delivery, and consequently, the injection, lasts as long as the piston does not encounter the point of intersection of the slot 43 and the helical groove 45. Beyond this point, the delivery ceases and the oil passes through the valve 51 and through the return pipe 53 for the oil into the upper part of the pump body, no longer producing any external effect.

During the upward stroke, the oil delivered lifts the valve 52 (the spring of which is so adjusted as to exert a smaller pressure than that of valve 50) until the piston encounters the point of intersection of the slot 44 and the helical groove 46. At this moment the delivery towards valve 52 is closed, the pressure lifts the valve 50 and the oil actuates, as previously, the control for the injection needles, for advanced injection (and ignition).

The shaft 6 also carries a cylindrical sleeve 54 which is not keyed thereon and which can be angularly displaced relatively to shaft 6 by any convenient mechanism. This sleeve carries three cams such as 55 (only one being visible in the drawing) adapted to control three different safety mechanisms, one the ring 56 (Figs. 2 and 3) controlling the orifices putting the air receivers 8 in communication with the exhaust, the second ring 67 (Fig. 3) controlling the exhaust openings, and the third actuating the rotary sleeve valve 41 of the regulating or fuel supply pump and this, by means of the following mechanism:

By means of the push-rod 58 (Fig. 9) the cam 55 acts on an oil piston 59 which, through the medium of a pipe 60 actuates piston 61 (Fig. 12) sliding in a cylinder 62 and the rod of which controls the arm 42 of the sleeve 41 by a connecting link 63. When the piston 59 ceases to deliver oil, the oil slowly flows back under the action of return spring 64 and through a narrow adjusted orifice 61a provided in the body of the piston 61.

As soon as the driving piston has reached the limit of normal safety (about 1 centimeter from the extreme dead centre) the cam 55 begins to intervene for reducing the injection and increasing the advance; the return spring 64 intervenes between two consecutive actions of the cam 55 and slowly reverses the action of the latter. The stability of the operation for a given working results from these two opposed actions.

It is to be noted that the pump controlled by the cam 55 corresponding to the upper dead centre of cylinder 7, supplies the lower engine. A second identical unit is provided for symmetrically controlling the supply of the upper engine.

The principle of this crossed regulation or control allows, in particular, the control or regulating member in intervene at the very moment of the impulse following an incorrect impulse.

The control of the power is effected by the variation of the delivery pressure of the compressor. This variation is obtained by the action of special closing devices 56, Figures 2 and 3, which more or less completely close the orifices directly communicating between the intermediate compressed air tank 8 and the exhaust manifolds 65 (short-circuiting the scavenging circuit in the cylinder). Simultaneously the exhaust ports 31 (Fig. 3) which are shaped longer than usual are more or less closed by a suitable closing device 67 (circular ring the arrangement of which presents no difficulty owing to the pressures and temperatures to which it is subjected). This partial closure has the effect of increasing or of augmenting the effective distance apart of the exhaust ports at the centre of the cylinder. Also simultaneously, the regulating device is modified for allowing a certain supplementary approach of the opposite pistons or on the contrary for increasing the distance separating them.

Figure 8:
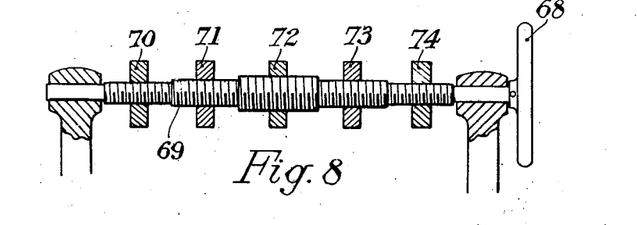
Figure 8 is an axial section of a device controlling regulating members.

These various operations can, for instance, be effected by means of compressed oil, by the operation of a single hand control wheel (Fig. 8). The manual control wheel 68 drives a shaft 69 comprising a series of different screw threads—each of said screw threads controls a nut 70, 71, 72, 73 or 74. Each of said nuts acts, at the desired point and to the required extent on the slide-valve of a compressed oil servo-motor (not shown) which respectively controls: the movement of the rings 56, that of the rings 67 closing the exhaust, the displacement of the closing device 75, Fig. 3, described hereafter, the adjustment of the cams 55, and finally the throttling of the fuel supply.

For a machine operating with a pressure of 6 kgs. at the admission—the dead space, in each of the two cylinders constituting the double piston cylinder, would be of the order of 5.5 cm. with a final pressure of 45 kgs. after the compression stroke.

The latitude for adjusting the inlet pressure to the said machine would be approximately 5 kgs. to 2 kgs. For this latter pressure the exhaust port 29 would be spaced from the centre of the engine cylinder to the extent of 3 cm., the clearance would be reduced from 5.5 to 3 cm. and the compression would still remain greater than 25 kgs. and would allow self-ignition owing to the temperature of the air, arising, on the one hand, from the compression in the compressor and, on the other hand, from the heat yielded to the air by the pistons, cylinders and exhaust conduits.

The safety latitude which would subsist at this instant before the pistons come into contact would still be slightly more than 1 cm.

The residual dead space at the time of contact, the volume occupied by the partitions 34 being taken into consideration (Fig. 5) would correspond to 2 cm. of the length of the cylinder.

The power furnished by the machine with an inlet pressure of 2 kgs., the diminution of the number of impulse per minute and the diminution of the weight of fuel burnt per minute being taken into account, would be then substantially a quarter of the maximum power.

If it was necessary to still further reduce this power, by means of suitable control members, for instance oil pressure members, the closing devices 75 provided on the cylindrical wall of the compressor symmetrically relatively to the median plan of the cylinder at right angles to the axis of this cylinder would be progressively opened. This would have the effect of reducing the useful stroke of the compressor to the quarter of its initial value. This would correspond to a further reduction of 75% of the power, which would thus fall to $\frac{1}{16}$ of the maximum power.

Starting can be obtained in the following manner:

1. By means of the hand wheel 68, the regulating members are placed at the minimum power;

2. By means of a train of gear-wheels which moreover has no important stress to overcome, the shafts 6 are swung round to place the machine in starting position with the compressor piston at about 5 centimeters from the upper dead centre, for instance. A lock (not shown) holds the rods 16 stationary at this moment;

3. The intermediate air tanks 8 are charged at a pressure of 2 kgs.

4. Air at a pressure of 5 kgs. is admitted in the clearance of 5 cm. of the compressor;

5. The lock holding the rods stationary is disengaged and the main valve of the machine is gradually opened.

The safety of the machine is ensured, in the first place, by the correct operation of the control members, which are simple and which are, of course, provided in duplicate.

In the second place, by the automatic intervention of additional safety devices, cutting off the admission of fuel as soon as the safety space falls to a predetermined value (3 mm. for instance).

In the third place, by the automatic intervention of the member illustrated in Fig. 14.

Opposite each delivery valve carried by the compressor piston 1 is arranged a suitable closure 76 secured on the end plate 4a of the corresponding cylinder 4 and held by a spring 77 at a certain distance from the inner face of the said end plate exactly at the safety distance, which still leaves, as may be seen, a freedom of movement slightly more than 1 cm. As soon as this safety distance is reached, all the exhaust is closed. The air contained in the clearance 78 therefore opposes to the continuation of the movement a resistance which increases extremely rapidly. For avoiding serious accidents, a safety valve (not shown) is provided in order to limit the stress exerted on the end plate of the compressor to that which it can efficiently support.

If the combination of these safety means accidentally proves to be insufficient, the two movable masses unavoidably come in contact. Arrangements are provided for the shock to take place on the end dome of the pistons, but considering the speeds and the magnitude of the masses in motion, the momentum of the shock must be resiliently absorbed:

1. By the domes themselves,

2. By the flexure or bending of the oblique annular fillets 3c of the hollow rods 3, and still more by the resilient bending of the arm 17, Figs. 1, 2, 3;

3. By the modification of the speeds of the oscillating masses which are free and which interchange and divide their amounts of movement in the inverse relation of these masses.

Here again it must be noted that the mechanisms of the shafts 6 and of the levers 22 with their accessories are not subjected to any abnormal stress. The only element of the machine which might be subjected to damage owing to the inertia of its own mass, is the compressor piston 1 at its joining with the rod 3. Particular care must be taken with this assembly and it must be rendered semi-resilient by the insertion of slightly plastic washers.

It is to be noted that none of the regulating or safety members are movable, that they are all accessible in operation and that also they are all protected from the action of shocks to which the machine is unavoidably subjected.

Figure 15:
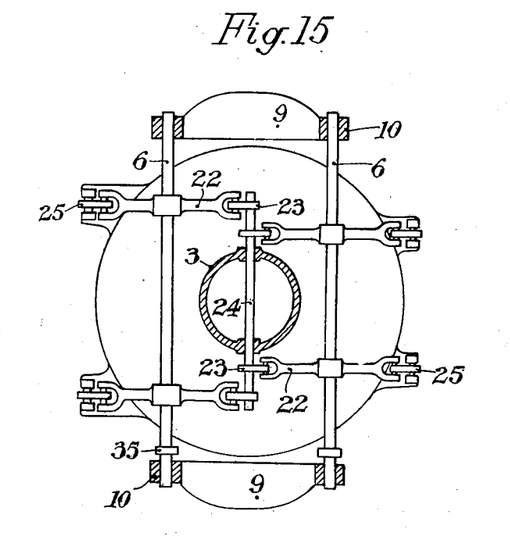
Figure 15 is a plan view similar to Figure 6 showing a modification.

In Fig. 15, the fork levers 22 of Fig. 6 have been replaced, each by two plane levers placed on either side of the central hollow rod 3.

The suspension method and arrangement of the movable masses previously described is of very general applications.

Its application to machines having symmetrical free pistons, in which a single air compressor is comprised between two engine cylinders symmetrically placed relatively thereto, is particularly advantageous. Alone it allows of easily constructing such machines, by allowing them to take the maximum advantage of the free piston principle. In fact, there can be obtained: the maximum simplicity, and facility of construction, the best efficiency, the maximum power per unit of mass and the maximum of regularity (one driving impulse at every stroke).

Figures 16, 17, 18:
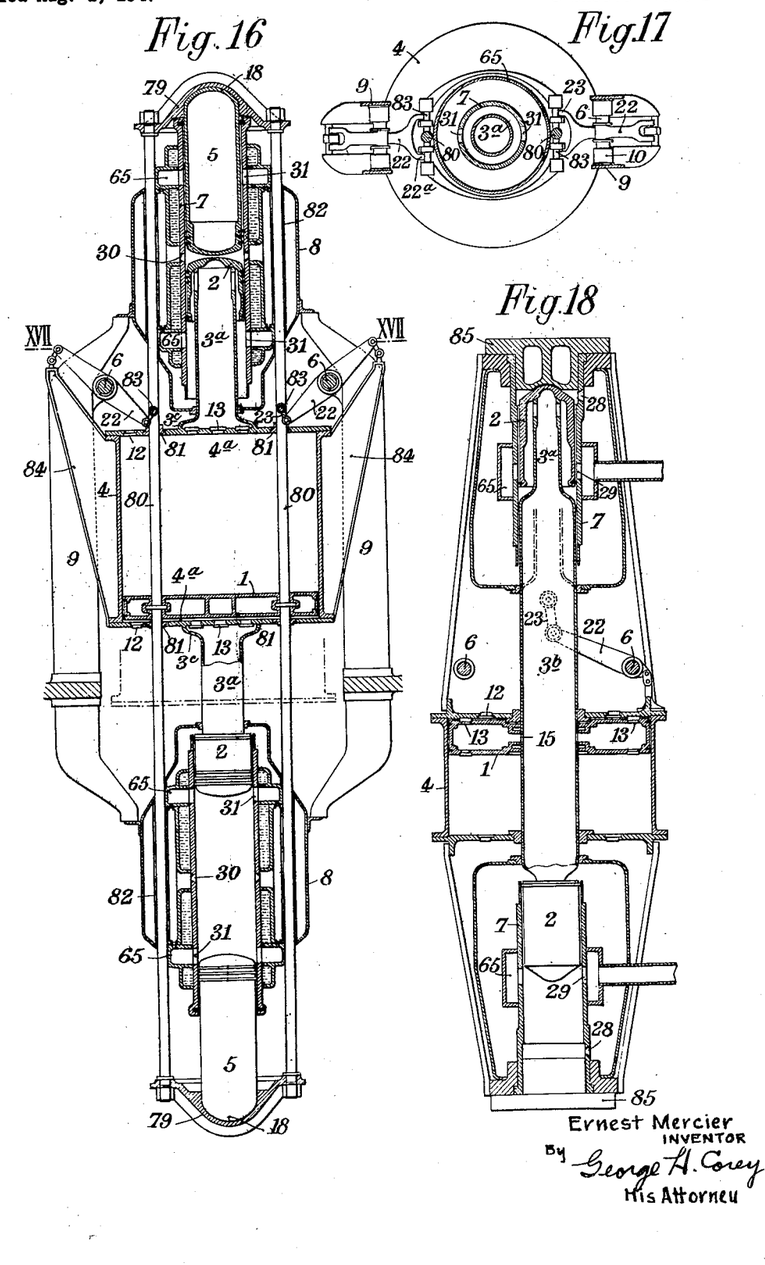
Figure 16 is a diagrammatic vertical section of a second embodiment of the machine of the invention.
Figure 17 is a horizontal section made according to line XVII—XVII of Figure 16.
Figure 18 is a vertical section of a third embodiment of the machine of the invention.

The above described combination is not the only one which can be contemplated. Figs. 16 to 18 show, by way of examples only, two other arrangements which are also possible and which present particular and very interesting advantages. These arrangements are the following:

With the same general arrangement previously described, that is to say with a central compressor piston 1 and compressor cylinder 4 comprised between two engine cylinders 7 each having double pistons 2 and 5, the movable masses can be arranged in quite a different manner (Figs. 16 and 17). One of these masses comprises the two inner engine pistons 2 and the casing 4 of the compressor (instead of the compressor piston). The other reciprocating mass comprises the two outer engine pistons 5 and the piston 1 of the compressor.

The compressor piston 1 is actuated by a cross member 79, and the opposite cross member, by means of two tie-rods 80 which pass through the heads 4a of the compressor in stuffing-boxes 81, and which pass through the indermediate air tank 8 within tubes 82.

The suction valves 12 and the delivery valves 13 are mounted on the heads or plates 4a of the compressor cylinder, the delivery valves 13 being formed at the centre of these heads in communication with the interior of the hollow rods 3a.

The balance beams 22, on the one hand, are attached at 83 to the rods 80 and, on the other hand, to the cylinder and to the end plates of the compressor by means of intermediate members 84.

It will be seen with this disposition of the lever 22 that space is not required in line with the pistons 2 for the distance travelled by the points 83, so that the length of the apparatus is reduced by a little more than half the total stroke as compared with the apparatus of Fig. 1.

An appreciable saving is also obtained in the length of the inner engine cylinders for it is possible here to shorten their pistons appreciably without difficulty with respect to direct leakages of the scavenging air through the exhaust ports of the engine, and it is therefore unnecessary to lengthen the engine pistons for the purpose of enabling supplementary sealing members to be mounted thereon with a view to isolating the exhaust ports when the engine pistons are at their lower dead centres.

On the whole, the machine is substantially shorter than in the first case illustrated.

Moreover the end plates of the compressor are very much better supported to take the thrust of compression and finally it is easier to equalise both the movable masses correctly.

In the last arrangement illustrated (Fig. 18) both driving cylinders 7 placed on either side of the compressor 4 are ordinary simple cylinders having a single piston 2. These cylinders are then closed, on the outer side, by cylinder heads 85.

One of the movable bodies comprises both driving pistons 2 and the piston 1 of the compressor, the other comprises all the cylinders and the casings. This second body is five to eight times the weight of the first one. The lever arms of the balance beams 22 and the strokes are in inverse ratio to these masses.

Only the suspension shafts 6 are fixed (with the exception of their movement of oscillation).

This machine, although it has a power-to-weight ratio smaller than the preceding ones, can be advantageous in certain cases owing to its extreme simplicity and to its very small length.

Of course, the invention includes all other modifications comprising one or more of the essential arrangements above set forth. In particular, all the preceding machines, shown vertical, can be horizontally arranged. In this case, the shafts of the balance beams are not required to serve as supports for the weights of the movable bodies. Their operation is not modified thereby. In the case of marine machines, it is logical to use the horizontal arrangement. In this case, the shafts of the balance beams serve partially as supports for the weights of the movable bodies during rolling and pitching movements.

Thus also for adjusting the power, instead of the device indicated, use can also be made of a valve similar to regulating valves of steam turbines and arranged between the intermediate tank and the main conduit. This arrangement is particularly indicated in the case of a battery of generators.

What I claim as new and desire to secure by Letters Patent is:

1. A fluid pressure machine of the reciprocating type comprising at least two prime mover cylinders arranged with their axes extending in the same general direction and in opposed spaced relation in said direction, a pair of pistons in each cylinder adapted for reciprocating movement thereof along the axes of the respective cylinders, means operatively connecting a piston of one cylinder with a piston of the other cylinder as a set for concomitant reciprocating movement of said pistons axially in their respective cylinders, means operatively connecting the other pistons respectively in said cylinders as a set for concomitant reciprocating movement of said other pistons axially in their respective cylinders, means operatively connected between said first set of connected pistons and said other set of connected pistons to provide for synchronous movement of said first set of connected pistons in a given direction in said cylinders concomitantly with movement of said other set of connected pistons in the opposite direction in said cylinders, and means cooperating with said means connected between said first set of connected pistons and said other set of connected pistons for balancing the forces developed in the masses of said oppositely moving sets of connected pistons and their connecting means during said reciprocating movements thereof corresponding to expansion and compression strokes of said pistons in the respective prime mover cylinders.

2. A fluid pressure machine of the reciprocating type comprising at least two prime mover cylinders arranged with their axes extending in the same general direction and in opposed spaced relation in said direction, a pair of pistons in each cylinder adapted for reciprocating movement thereof along the axes of the respective cylinders, the pistons of said cylinders which are adjacently disposed being operatively connected to each other as a set to move together in reciprocating movement along the axes of the respective cylinders, the pistons of said cylinders which are outwardly disposed being operatively connected to each other as a set to move together in reciprocating movement along the axes of their respective cylinders, means operatively connecting the set of said connected adjacent pistons to the set of said connected outwardly disposed pistons to provide for reciprocating movements of said adjacent pistons and said outwardly disposed pistons in opposite directions concomitantly with alternate expansion and compression of the fluid confined between the pistons of the respective prime mover cylinders, the relation of the mass of said set of adjacent pistons and the operative connection therebetween to the mass of the set of said outwardly disposed pistons and the operative connection therebetween being substantially the inverse of the relation of said movements of said sets of pistons, whereby the forces of the fluid pressure acting on said pistons are transmitted through said respective operative connections between the adjacent pistons and between the outwardly disposed pistons without substantial transmission of said forces through said means operatively connecting said set of adjacent pistons to said set of outwardly disposed pistons.

3. A fluid pressure machine of the reciprocating type comprising at least two prime mover cylinders arranged coaxially and in opposed spaced relation along the common axis, each cylinder having a pair of pistons therein for reciprocating movement thereof along said axis, the adjacently disposed pistons in said two cylinders being connected to move together and the outer pistons in said cylinders being connected to move together respectively as rigid units in the two directions of reciprocating movement along said common axis, said rigid units having masses in a predetermined relation, and a kinematic mechanism operatively connected between said rigid units and providing movements thereof of lengths in the inverse relation to said predetermined relation of said masses.

4. A fluid pressure machine as defined in claim 1 in which said means operatively connected between said two oppositely moving sets of connected pistons comprises a pivoted member having two arms extending outwardly with respect to the pivotal axis of said pivoted member, one of said arms being operatively connected to one set of connected pistons and their connecting means and the other arm being operatively connected to the other set of pistons and their connecting means, the length of said arms being inversely proportional to the masses of said sets of connected pistons and their respective connecting means to which the respective arms are connected.

5. A fluid pressure machine of the reciprocating type comprising at least two prime mover cylinders arranged coaxially and in opposed spaced relation along the common axis, each cylinder having a pair of pistons therein for reciprocating movement thereof along said axis, the adjacently disposed pistons in said two cylinders being connected so as to move together as a rigid member in the two directions of reciprocating movement along said common axis, the two outer pistons in said cylinders being connected so as to move together as a rigid member in the two directions of reciprocating movement along said common axis, and means comprising an oscillatible member operatively connected to said rigid members to provide for a predetermined movement of said adjacent pistons in one direction along said common axis concomitant with a given movement of said outer pistons in the opposite direction along said common axis in accordance with changes in the volume of the fluid confined within the respective cylinders between the pistons operating therein, the masses of said rigid members and the respective operative connections thereof to said oscillatible member being in inverse relation to the relation of said movements of the respective rigid members.

6. A fluid machine as defined in claim 5 in which said oscillatible member provides two points of attachment outwardly positioned thereon with respect to the pivotal axis of said oscillatible member and said operative connections comprise kinematic connections respectively between said rigid members and said oscillatible member at said points of attachment, the lengths of the radii to said points of attachment being in inverse relation to the respective masses of said rigid member to which they are connected.

7. A fluid pressure machine as defined in claim 5 in which said rigid members are of substantially equal mass and said oscillatible member provides two arms extending outwardly with respect to the pivotal axis of said oscillatible member, one of said arms being kinematically connected to one rigid member and the other arm being kinematically connected to the other rigid member to produce equal and opposite movements of said pistons in the respective cylinders.

8. A fluid pressure machine of the reciprocating type comprising at least two prime mover cylinders arranged with their axes extending in the same general direction and in opposed spaced relation in said direction, a pair of pistons in each cylinder adapted for reciprocating movement thereof in opposite directions as free pistons along the axes of the respective cylinders, said pistons being connected to provide two distinct reciprocating units, each of said units having a piston in each of said cylinders, said units being connected by a kinematic connection for synchronous movement thereof in opposite directions concomitantly with opposite movement of the pistons of the pair in each cylinder, and means for alternatingly developing fluid pressure between the pistons in the respective cylinders to produce separating movement of said pistons in the cylinder in which said pressure is developed and concomitantly approaching movement of the piston in the other cylinder, said kinematic connection comprising a balancing lever providing two arms respectively kinematically connected to said units to effect said opposite movements of said units and of their pistons along said axes of said cylinders in inverse relation to the masses of said units.

9. A fluid pressure machines of the reciprocating type comprising at least two prime mover cylinders arranged coaxially in opposed spaced relation along the common axis, each cylinder having a pair of pistons therein for reciprocating movement along said axis, the adjacently disposed pistons in the two cylinders being connected by a rigid tubular member coaxial with said common axis of said cylinders, the two outer pistons in said cylinders being rigidly connected to move together in reciprocating movement along said axis, and means operatively connecting said tubular member and said rigid connection to determine a predetermined relation of the lineal movement of said adjacent connected pistons along said axis with respect to the lineal movement of said outer connected pistons along said axis, the mass of said adjacent pistons and said rigid tubular member and the connections therebetween with respect to the mass of said outer piston and said rigid connection therebetween being in inverse relation to the relation of said lineal movements of said adjacent pistons with respect to said outer pistons.

10. A fluid pressure machine of the reciprocating type as defined in claim 1 which comprises a gas compressor having a cylinder operatively connected to one of said sets of connected pistons and a piston operatively connected to another of said sets of connected pistons for movement of said compressor cylinder and said compressor piston relative to each other concomitantly with reciprocating movements of said sets oppositely to each other.

11. A fluid pressure machine of the reciprocating type as defined in claim 1 which comprises a gas compressor having a cylinder operatively connected to one of said sets of connected pistons and a piston operatively connected to the other of said sets of connected pistons for movement of said compressor cylinder and said compressor piston relative to each other concomitantly with reciprocating movements of said sets oppositely to each other, said compressor cylinder and said compressor piston cooperating with said balancing means for effecting the balancing of said forces developed in said masses of said moving sets and in said compressor cylinder and compressor piston.

12. A fluid pressure machine of the reciprocating type as defined in claim 3 which comprises a gas compressor having a cylinder coaxial with said two cylinders and rigidly connected to one of said rigid units for movement of said compressor cylinder along the common axis of said cylinders, said compressor having a piston within said cylinder rigidly connected to said other rigid unit for movement along said common axis within said compressor cylinder.

13. A fluid pressure machine of the reciprocating type comprising a pair of internal combustion engines arranged in opposed balanced relation and each having opposed pistons reciprocating in the cylinders thereof, an air compressor operatively connected to both of said engines to deliver compressed air to said engines for combustion and scavenging purposes, said compressor comprising a piston and a compressor cylinder mounted for reciprocating movement with relation to one another, said compressor piston being connected for movement synchronously with two engine pistons one of which reciprocates in a cylinder of one engine and the other of which reciprocates in a cylinder of the other engine, and said compressor cylinder being similarly connected to an opposing pair of engine pistons respectively reciprocating in the corresponding engine cylinders of the two opposed engines.

14. A fluid pressure machine of the reciprocating type comprising a tube, a compressor cylinder slidably mounted upon said tube, a piston carried by said tube and operable in said compressor cylinder between opposed walls thereof, said cylinder and piston being adapted to reciprocate in repeated cycles so as to compress air therebetween, valve means for admitting compressed air from between said piston and cylinder to said tube, a pair of opposed internal combustion engine cylinders arranged adjacent said tube and receiving compressed air therefrom, a pair of opposed pistons in each of said engine cylinders, one piston of each of said pairs being connected for coordinated movement with said compressor piston and the other piston of each of said pairs being connected for coordinated movement with said compressor cylinder.

15. A fluid pressure machine of the reciprocating type comprising a tube, a compressor cylinder reciprocating thereon, a hollow piston supported by and movable with said tube for reciprocating movement within said cylinder toward and away from opposed end walls thereof, means for venting air compressed in said cylinder by the mutual reciprocation of said piston and cylinder into said piston and thence into said tube, a pair of opposed internal combustion engine cylinders disposed adjacent said tube and receiving compressed air therefrom, a pair of opposed pistons in each of said engine cylinders, and means actuated by the outward movement of either pair of engine pistons in the expansion stroke thereof and operatively connected to said compressor cylinder and said compressor piston to produce movement of said compressor cylinder and of said compressor piston relative to each other in synchronism with the movement of said engine pistons.

16. A fluid pressure machine of the reciprocating type comprising a tube, a compressor cylinder reciprocating thereon, a hollow piston supported by and movable with said tube for reciprocating movement within said cylinder toward and away from opposed end walls thereof, means for venting air compressed in said cylinder by the mutual reciprocation of said piston and cylinder into said piston and thence into said tube, a pair of opposed internal combustion engine cylinders disposed adjacent said tube and receiving compressed air therefrom, a pair of opposed pistons in each of said engine cylinders, means actuated by the outward movement of either pair of engine pistons in the expansion stroke thereof and operatively connected to said compressor cylinder and said compressor piston to produce reciprocating movement of said compressor cylinder and of said compressor piston relative to each other in synchronism with the movement of said engine pistons, and means movable synchronously with the compressor piston and cylinder during the expansion stroke of the pistons of one of said engines to impart compressive movement to the engine pistons operating in the opposed engine.

17. A fluid pressure machine of the reciprocating type comprising a pair of internal combustion engines each having a cylinder open at its ends, the cylinder of one engine being arranged in opposed relation to the cylinder of the other engine, a pair of pistons in each cylinder operable lengthwise of the cylinder in reciprocating movement, means connecting the adjacent pistons of the opposed cylinders for synchronous movement during alternate compression and expansion strokes thereof in their respective cylinders, means connecting the remotely disposed pistons of said opposed cylinders for similar synchronous movement simultaneously with and opposite to the movements of said adjacent pistons in their respective cylinders, air compressor means having oppositely moving elements respectively operatively connected to said connected reciprocating pistons for synchronous operation therewith, and means reciprocatable with one of said compressor elements for conducting compressed air from said compressor to said opposed cylinders and delivering said compressed air between the two pistons which are in the respective opposed cylinders.

18. A fluid pressure machine of reciprocating type as defined in claim 2 in which said operative connection between said adjacently disposed pistons comprises a piston of a gas compressor of the reciprocating type rigidly connected to said adjacent pistons to move together therewith in the reciprocating movement thereof, said operative connection between said outwardly disposed pistons comprising a cylinder of said gas compressor rigidly connected to said outwardly disposed pistons to move together therewith in the reciprocating movement thereof.

19. A fluid pressure machine of the reciprocating type as defined in claim 2 in which said operative connection between said adjacently disposed pistons comprises a cylinder of a gas compressor of the reciprocating type rigidly connected to said adjacent pistons to move together therewith in the reciprocating movement thereof, said operative connection between said outwardly disposed pistons comprising a piston of said gas compressor rigidly connected to said outwardly disposed pistons to move together therewith in the reciprocating movement thereof.

20. A fluid pressure machine of the reciprocating type as defined in claim 2 which comprises a gas compressor having a cylinder operatively connected to one of said sets of connected pistons and a piston operatively connected to another of said sets of connected pistons for movement of said compressor cylinder and said compressor piston relative to each other concomitantly with reciprocating movements of said sets oppositely to each other, said operative connection between said adjacently disposed pistons comprising a tubular member adapted to convey the compressed gas from said compressor to at least one of said two cylinders in which said adjacent pistons respectively reciprocate.

21. A fluid pressure machine of the reciprocating type as defined in claim 3 in which said connection between said adjacently disposed pistons in the two cylinders comprises a tubular member coaxial with said two cylinders and having a portion of reduced diameter adapted to engage at least one of said adjacent pistons internally thereof, said portion of reduced diameter being connected to the main portion of said tubular member by a neck providing flexibility of said portions with respect to each other.

22. A fluid pressure machine of the reciprocating type as defined in claim 3 in which said connection between said adjacently disposed pistons in the two cylinders comprises a tubular member generally coaxial with said two cylinders and having a portion of reduced diameter adapted to engage at least one of said adjacent pistons internally thereof so as to provide for lateral movement of said piston relative to the end of said reduced portion of said tubular member to accommodate for alignment of the piston with the cylinder.

23. A fluid pressure machine of the reciprocating type as defined in claim 2 which comprises a gas compressor having a cylinder operatively connected to one of said sets of connected pistons and a piston operatively connected to another of said sets of connected pistons for movement of said compressor cylinder and said compressor piston relative to each other concomitantly with the reciprocating movements of said sets oppositely to each other, said operative connection between said adjacently disposed pistons comprising a tubular member adapted to convey therethrough the compressed gas from said compressor toward at least one end thereof, and means providing a reservoir cooperating with said tubular member and the cylinder in which the piston operates to which said tubular member is connected at said end for delivering said compressed air between the pistons of said cylinder at said end of said tubular member.

24. A fluid pressure machine of the reciprocating type as defined in claim 2 which comprises a gas compressor having a cylinder operatively connected to one of said sets of connected pistons and a piston operatively connected to another of said sets of connected pistons for movement of said compressor cylinder and said compressor piston relative to each other concomitantly with reciprocating movements of said sets oppositely to each other, said operative connection between said adjacently disposed pistons comprising a tubular member adapted to convey the compressed gas from said compressor to at least one of said two cylinders in which said adjacent pistons respectively reciprocate, said compressor being provided with valve means adapted to cooperate with said tubular member for controlling the entrance of gas into said compressor and delivery of the compressed gas therefrom into said tubular member to be conveyed therethrough.

25. A fluid pressure machine of the reciprocating type comprising at least two opposed prime mover cylinders, at least one piston in each cylinder, said pistons and their respective cylinders being adapted for reciprocating axial movement thereof relative to each other, means operatively connecting a piston of one cylinder with a piston of another cylinder to form a unit, means operatively connecting said cylinders to form another unit, said operative connections providing for reciprocating movement of said units with respect to each other concomitantly with the reciprocating movements of said pistons and their respective cylinders relative to each other, means operatively connected between said units to provide for synchronous reciprocating movement of said units and their connected pistons and cylinders in opposite directions relative to each other, a gas compressor comprising a cylinder and a piston within said compressor cylinder adapted for movement axially relative to each other, said compressor cylinder and said piston thereof respectively being connected to said units for movement of said compressor cylinder and said piston relative to each other concomitantly with the reciprocating movements of said units with respect to each other, and means cooperating with said means operatively connected between said units for balancing the forces developed in the masses of the oppositely moving units and of the respectively connected compressor cylinder and compressor piston during reciprocating movements of the several pistons relative to the respective cylinders.

26. A fluid pressure machine of the reciprocating type comprising at least two opposed prime mover cylinders, at least one piston in each cylinder, said pistons and their respective cylinders constituting assemblies each comprising two elements adapted for reciprocating axial movement of said elements relative to each other in each assembly, means operatively connecting an element of a given assembly to an element of another assembly to form a unit, means operatively connecting the other element of said given assembly to the other element of said other assembly to form another unit, said operative connections providing for reciprocating movement of said units with respect to each other concomitantly with the reciprocating movements of said elements in the respective assemblies relative to each other, means operatively connected between said units to provide for synchronous reciprocating movement of said units and their connected elements in opposite directions relative to each other, and a gas compressor comprising a cylinder and a piston within said compressor cylinder adapted for movement axially relative to each other, said compressor cylinder and said piston thereof respectively being connected to said units for movement of said compressor cylinder and said piston relative to each other concomitantly with the reciprocating movements of said units with respect to each other.

27. A fluid pressure machine of the reciprocating type as defined in claim 26 which comprises means cooperating with said means operatively connected between said units for balancing the forces developed in the masses of the oppositely moving units and of the respectively connected compressor cylinder and compressor piston during reciprocating movements of the several pistons relative to the respective cylinders.

28. A fluid pressure machine of the reciprocating type comprising at least two opposed prime mover cylinders, at least one piston in each cylinder, said pistons and their respective cylinders constituting assemblies each comprising two elements adapted for reciprocating axial movement of said elements relative to each other in each assembly, means operatively connecting an element of a given assembly to an element of another assembly to form a unit, means operatively connecting the other element of said given assembly to the other element of said other assembly to form another unit, said operative connections providing for reciprocating movement of said units with respect to each other concomitantly with the reciprocating movements of said elements in the respective assemblies relative to each other, means operatively connected between said units to provide for synchronous reciprocating movement of said units and their connected elements in opposite directions relative to each other, and a gas compressor comprising a cylinder and a piston within said compressor cylinder adapted for movement axially of said cylinder, said compressor piston being connected to one of said units for movement of said compressor piston in said compressor cylinder concomitantly with the reciprocating movement of said connected unit, said means operatively connected between said units for synchronous reciprocating movement thereof in opposite directions being adapted to provide for movements of said units that are in relation to each other inversely to the relation to each other of the masses of said units.

29. A fluid pressure machine of the reciprocating type comprising at least two opposed prime mover cylinders, at least one piston in each cylinder, said pistons and their respective cylinders constituting assemblies each comprising two elements adapted for reciprocating axial movement of said elements relative to each other in each assembly, means operatively connecting an element of a given assembly to an element of another assembly to form a unit, means operatively connecting the other element of said given assembly to the other element of said other assembly to form another unit, said operative connections providing for reciprocating movement of said units with respect to each other concomitantly with the reciprocating movements of said elements in the respective assemblies relative to each other, means operatively connected between said units to provide for synchronous reciprocating movement of said units and their connected elements in opposite directions relative to each other, and a gas compressor comprising a cylinder and a piston within said compressor cylinder adapted for movement axially relative to each other, said compressor cylinder being connected to one of said units for movement of said compressor cylinder concomitantly with the reciprocating movement of said unit.

30. A fluid pressure machine of the reciprocating type comprising at least two opposed prime mover cylinders and at least one compressor cylinder, at least one piston in each cylinder, said cylinders and their respective pistons constituting assemblies each comprising two elements adapted for reciprocating axial movement of said elements oppositely relative to each other in each assembly, means operatively connecting an element of a given assembly to an element of another assembly to form a unit which includes an element of a prime mover assembly and an element of the compressor assembly, means operatively connecting another element of said given assembly to another element of said other assembly to form another unit which includes another element of said prime mover assembly and another element of said compressor assembly, and means operatively connected between said units to provide for synchronous reciprocating movement of said units and their connected elements in opposite directions relative to each other concomitantly with reciprocating movement of said prime mover elements with respect to each other, the relation of the lengths of said movements of said units being inverse with respect to the relation of the masses of said units.

31. A fluid pressure machine of the reciprocating free piston type comprising a prime mover cylinder assembly having at least two elements each reciprocatably movable and in opposite directions relative to each other and adapted to close the cylinder so as to confine a fluid therebetween to produce a driving impulse at each stroke of the relative movement of said elements, a compressor cylinder assembly having at least two elements each reciprocatably movable and in opposite directions relative to each other and adapted to close the cylinder so as to confine a fluid therebetween to produce compression of said fluid at each stroke of the relative movement of said elements, means rigidly connecting said oppositely moving elements of said prime mover assembly respectively to said oppositely moving elements of said compressor assembly to provide two distinct units each comprising a prime mover element and a compressor element, and means operatively connecting said units so as to provide for reciprocating movements of said units oppositely relative to each other in inverse relation of the lengths of said movements with respect to the relation of the masses of said units.

32. A fluid pressure machine of the reciprocating type as defined in claim 31 in which at least one of the reciprocatably movable elements of the compressor cylinder assembly is common to two reciprocatably movable elements of said prime mover cylinder assembly to which it is connected to provide one of said units.

33. A fluid pressure machine of the reciprocating free piston type comprising a prime mover envelope and piston assembly providing two elements each reciprocatably movable and in opposite directions relative to each other and cooperating to confine a fluid acting on said elements to produce a driving impulse at each stroke of the machine to develop prime mover operation thereof, a compressor envelope and piston assembly providing two elements each reciprocatably movable and in opposite directions relative to each other and cooperating to confine a fluid acted on by said elements of said compressor assembly to produce compression of said fluid at each stroke of the machine in compressor operation thereof, means connecting said oppositely moving elements of said prime mover assembly respectively to said oppositely moving elements of said compressor assembly so as to provide two distinct units each comprising an element of the prime mover assembly and an element of the compressor assembly, and means operatively connecting said units so as to provide for reciprocating movements of said units oppositely relative to each other in inverse relation of the lengths of said movements with respect to the relation of the masses of said units.

34. A fluid pressure machine of the reciprocating type comprising at least two prime mover cylinders arranged with the axes extending in the same general direction and in opposed spaced relation in said direction, a pair of pistons in each cylinder adapted for reciprocating movement thereof along the axes of the respective cylinders, means operatively connecting a piston of one cylinder with a piston of the other cylinder as a set for concomitant reciprocating movement of said pistons axially in their respective cylinders, means operatively connecting the other pistons respectively in said cylinders as a set for concomitant reciprocating movement of said other pistons axially in their respective cylinders, means operatively connecting said first set of connected pistons and said other set of connected pistons to provide for synchronous movement of said first set of connected pistons in a given direction in said cylinders concomitantly with movement of said other set of connected pistons in the opposite direction in said cylinders, and a gas compressor having a cylinder operatively connected to a given one of said sets of connected pistons to move therewith and a piston operatively connected to the other of said sets of connected pistons to move therewith and for reciprocating movement of said compressor cylinder and said compressor piston relative to each other concomitantly with reciprocating movements of said sets oppositely to each other.

35. A fluid pressure machine of the reciprocating type as defined in claim 34 in which said operative connection between said gas compressor piston and said other set comprises a tubular member reciprocating with said set and adapted to convey the compressed gas from said gas compressor to said prime mover cylinders.

36. A fluid pressure machine of the reciprocating type comprising at least two prime mover cylinders arranged coaxially and in opposed spaced relation along the common axis, each cylinder having a pair of pistons therein for reciprocating movement thereof along said axis, the adjacently disposed pistons in said two cylinders being connected to move together as a rigid unit in the two directions of said reciprocating movement thereof by a tubular strut member generally coaxial with said two cylinders and having a portion at each end adapted to engage the respective adjacent pistons, the outer pistons in said two cylinders being connected to move together as a rigid unit in the two directions of the reciprocating movement thereof by strut means acting symmetrically with respect to said axis, and a kinematic mechanism operatively connecting said rigid units and providing for synchronous movement thereof in opposite directions concomitantly with the movement of the respective connected pistons in the respective cylinders in opposite directions.

37. A fluid pressure machine of the reciprocating type as defined in claim 36 in which the end portions of said tubular member are of reduced diameter adapted to engage the pistons to which said tubular member is connected internally of said pistons.

38. A fluid pressure machine of the reciprocating type as defined in claim 36 which comprises a gas compressor operatively connected to said rigid units to be driven thereby concomitantly with said opposite movements thereof to effect compression of a gas and operatively connected to said tubular member to deliver said compressed gas to said tubular member, and valve means adapted to cooperate with said tubular member for controlling the delivery of compressed gas from said compressor through said tubular member to said prime mover cylinders.

39. A fluid pressure machine of the reciprocating type as defined in claim 36 in which the end portions of said tubular member are adapted to engage the respective adjacent pistons so as to provide for lateral movement of said pistons relative to said ends of said tubular member.

40. A fluid pressure machine of the reciprocating type comprising at least two prime mover cylinders arranged with their axes extending in the same general direction and in opposed spaced relation in said direction, a pair of pistons in each cylinder adapted for reciprocating movement thereof along the axes of the respective cylinders, the pistons of said cylinders which are adjacently disposed being operatively connected to each other as a set to move together in reciprocating movement along the axis of their respective cylinders, the pistons of said cylinders which are outwardly disposed being operatively connected to each other as a set to move together in reciprocating movement along the axes of their respective cylinders, means operatively connecting the set of said connected adjacent pistons to the set of said connected outwardly disposed pistons to provide for reciprocating movements of said adjacent pistons and said outwardly disposed pistons in opposite directions concomitantly with alternate expansion and compression of the fluid confined between the pistons of the respective prime mover cylinders, a gas compressor having a cylinder and a piston reciprocatable therein, said gas compressor cylinder being rigidly connected to said set of outwardly disposed pistons to move together therewith in reciprocating movement thereof, said gas compressor piston being rigidly connected to said set of adjacently disposed pistons to move together therewith in the reciprocating movement thereof.

41. A fluid pressure machine of the reciprocating type comprising at least two prime mover cylinders arranged with their axes extending in the same general direction and in opposed spaced relation in said direction, a pair of pistons in each cylinder adapted for reciprocating movement thereof along the axes of the respective cylinders, the pistons of said cylinders which are adjacently disposed being operatively connected to each other as a set to move together in reciprocating movement along the axes of their respective cylinders, the pistons of said cylinders which are outwardly disposed being operatively connected to each other as a set to move together in reciprocating movement along the axes of their respective cylinders, means operatively connecting the set of said connected adjacent pistons to the set of said connected outwardly disposed pistons to provide for reciprocating movements of said adjacent pistons and said outwardly disposed pistons in opposite directions concomitantly with alternate expansion and compression of the fluid confined between the pistons of the respective prime mover cylinders, a gas compressor having a cylinder and a piston reciprocatable therein, said gas compressor cylinder being rigidly connected to said set of adjacently disposed pistons to move together therewith in reciprocating movement thereof, said gas compressor piston being rigidly connected to said set of outwardly disposed pistons to move together therewith in the reciprocating movement thereof.

42. A fluid pressure machine of the reciprocating type comprising a pair of internal combustion prime mover cylinders arranged in opposed spaced relation to each other, a pair of pistons in each cylinder adapted for reciprocating movement thereof along the axes of the respective cylinders, an air compressor having a cylinder and a piston mounted for reciprocating movement of one relative to the other, said compressor piston being connected to two prime mover pistons one of which reciprocates in a cylinder of one prime mover and the other of which reciprocates in a cylinder of the other prime mover for movement of said compressor piston together with said prime mover pistons as a unit, said compressor cylinder being connected to the other prime mover pistons which respectively reciprocate in the corresponding prime mover cylinders for movement with said other prime mover pistons as a unit concomitantly with the movement of said first unit and the prime mover and compressor pistons connected therein.

43. A fluid pressure machine of the reciprocating type comprising a pair of internal combustion prime mover cylinders arranged in opposed spaced relation to each other, a pair of pistons in each cylinder adapted for reciprocating movement thereof along the axes of the respective cylinders, an air compressor having a cylinder and a piston mounted for reciprocating movement of one relative to the other, said compressor piston being connected to two prime mover pistons one of which reciprocates in a cylinder of one prime mover and the other of which reciprocates in a cylinder of the other prime mover for movement of said compressor piston together with said prime mover pistons as a unit, said compressor cylinder being connected to the other prime mover pistons which respectively reciprocate in the corresponding prime mover cylinders for movement with said other prime mover pistons as a unit, and means operatively connecting the unit comprising said compressor piston and the prime mover pistons connected thereto with the unit comprising the compressor cylinder and the prime mover pistons connected thereto for synchronous movement of said units in opposite directions concomitantly with reciprocating movement of said prime mover pistons in the prime mover cylinders and of said compressor piston and cylinder relative to each other.

44. A fluid pressure machine of the reciprocating type comprising at least two prime mover cylinders and at least one compressor cylinder, at least one piston in each cylinder, said cylinders and their respective pistons constituting assemblies each comprising two elements adapted for reciprocating axial movement of said elements relative to each other in each assembly, means operatively connecting an element of a given prime mover assembly to an element of another prime mover assembly and to an element of said compressor assembly to form a unit reciprocatable concomitantly with reciprocation of said elements in their respective assemblies, means operatively connecting another element of said given prime mover assembly to another element of said other prime mover assembly and to the other element of said compressor assembly to form another unit reciprocatable concomitantly with reciprocation of said other elements in their respective assemblies, one of said elements of said compressor assembly being said compressor cylinder, and means operatively connected between said units to provide for synchronous reciprocating movement of said units and their connected elements in opposite directions relative to each other concomitantly with the reciprocating movements of said elements in their respective assemblies.

45. A fluid pressure machine of the reciprocating type as defined in claim 37 in which said operative connection between said gas compressor cylinder and said given set of connected prime mover pistons comprises a tubular member reciprocating with said given set and said compressor cylinder and adapted to convey the compressed gas from said gas compressor to said prime mover cylinders.

ERNEST MERCIER.

REFERENCES CITED

The following references are of record in the file of this patent:

UNITED STATES PATENTS

| Number | Name | Date |
|---|---|---|
| 1,263,972 | Warner | Apr. 23, 1918 |
| 1,757,215 | Pescara | May 6, 1930 |
| 2,075,133 | Pescara | Mar. 30, 1937 |
| 2,112,368 | Janicke | Mar. 29, 1938 |
| 2,189,497 | Pescara | Feb. 6, 1940 |
| 2,265,285 | Janicke | Dec. 9, 1941 |

FOREIGN PATENTS

| Number | Country | Date |
|---|---|---|
| 269,252 | Germany | of 1914 |